Figure 1:
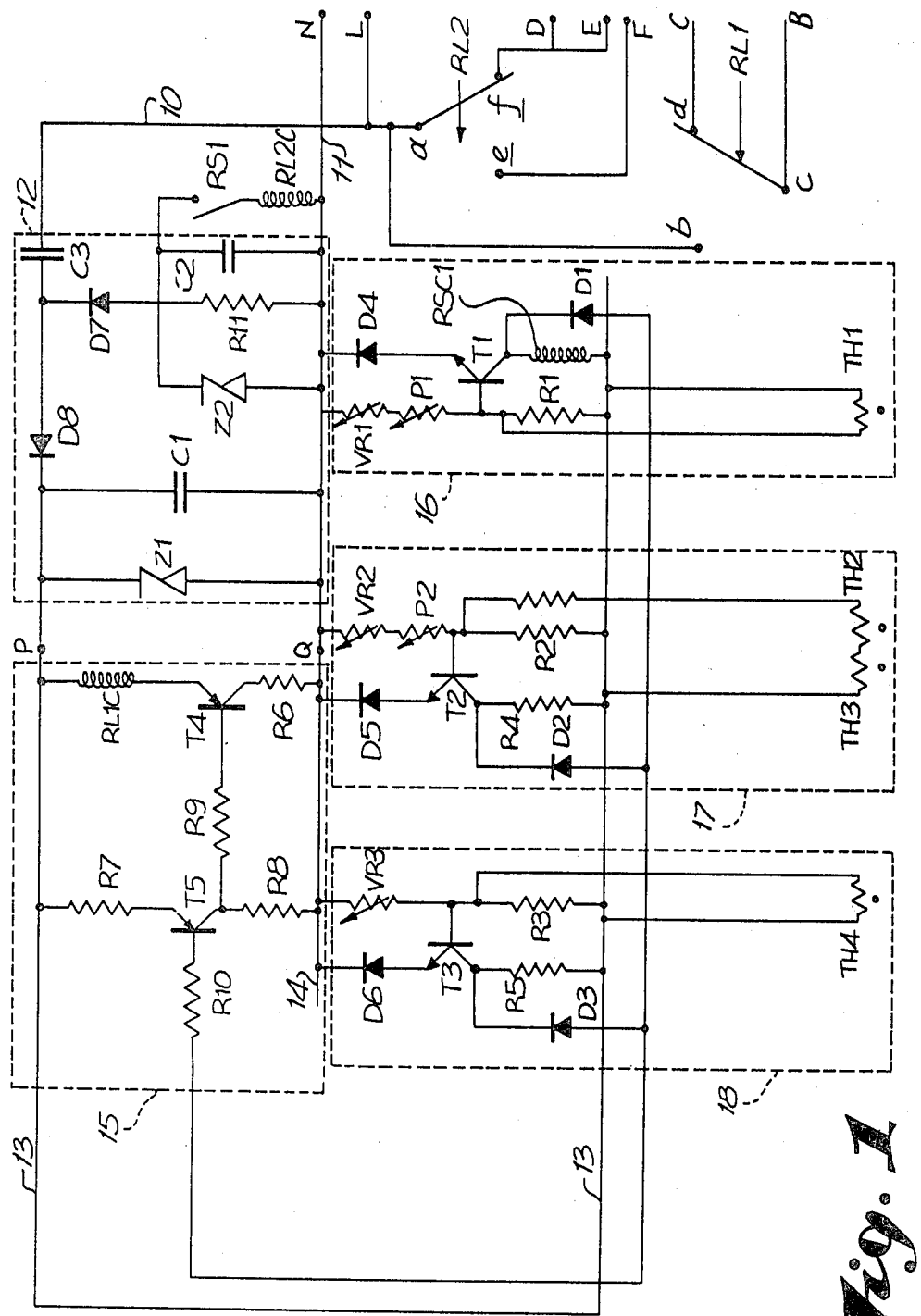

United States Patent [19]

Johnstone

[11] 4,290,551

[45] Sep. 22, 1981

[54] AUTOMATIC TEMPERATURE COMPENSATED BOILER THERMOSTAT

[75] Inventor: Frank Johnstone, Glasgow, Scotland

[73] Assignee: Carco Accessories Limited, Glasgow, Scotland

[21] Appl. No.: 97,829

[22] Filed: Nov. 27, 1979

[30] Foreign Application Priority Data

Nov. 30, 1978 [GB] United Kingdom ............... 46749/78

[51] Int. Cl.³ .......................... F24D 5/10; F24D 3/00
[52] U.S. Cl. ................................ 236/9 R; 236/91 F; 237/8 R
[58] Field of Search ................... 236/91 F, 91 G, 9 R; 237/8 R

[56] References Cited

U.S. PATENT DOCUMENTS

| | | | |
|---|---|---|---|
| 2,265,512 | 12/1941 | Brown et al. | 236/91 F |
| 2,272,492 | 2/1942 | Weyher | 236/91 F |
| 2,297,705 | 10/1942 | Jehle | 236/91 F |
| 2,375,988 | 5/1945 | Gille et al. | 236/91 F |

Primary Examiner—William E. Wayner
Attorney, Agent, or Firm—Cushman, Darby & Cushman

[57] ABSTRACT

A control apparatus for a fuel fired central heating boiler has a first temperature control circuit including a first thermistor for sensing external ambient temperature and a second thermistor for sensing the temperature of the circulating water produced by the boiler. A second temperature control circuit has a thermistor for sensing the temperature in the space to be heated. A relay is operated by the outputs of the first and second control circuits and itself controls the boiler. The first and second thermistors are connected in series and have different resistance/temperature characteristics so that a given change in the external ambient temperature corresponds to a greater change in the temperature of the circulating water.

15 Claims, 2 Drawing Figures

AUTOMATIC TEMPERATURE COMPENSATED BOILER THERMOSTAT

This invention relates to control apparatus for fuel fired central heating boilers.

It is a requirement in various countries that domestic fuel fired central heating boilers shall have a boiler thermostat whereby the temperature of water produced thereby is controlled during operation of the boiler. This boiler thermostat usually takes the form of a temperature sensing phial located in a hot water output from the boiler, the phial operating switch means which controls the fuel input to the boiler so that the water temperature is maintained between fixed limits. The most common type of central heating system in current use has a gravity fed hot water primary circuit for providing a supply of domestic hot water and a pumped secondary system for space heating. The consumer may control the temperature in the space to be heated by adjusting the boiler thermostat. There is usually no independent control of the temperature of the domestic hot water so that the temperature of stored hot water in a hot water cylinder slowly reaches that of the output of the boiler.

Such central heating systems have limitations. The user must make frequency adjustment of the boiler thermostat to maintain the space to be heated at a comfortable temperature and to conserve fuel, but this may often mean that an adequate supply of domestic hot water is not available. For example, when there is little demand for heat in the space to be heated, e.g. spring and autumn, so that the boiler thermostat is at a relatively low setting, it may take a long time to replenish the hot water stored in the hot water cylinder after there has been a large draw-off of hot water. On the other hand in cold weather, e.g. during winter, there is a high demand for heat in the space to be heated so that the hot water stored in the hot water cylinder can easily have a temperature in excess of 80° C. which is dangerous where children and old people are concerned. Another limitation of this type of central heating system is that, if it is switched off overnight and then switched on again by a time clock before a consumer rises, the setting of the boiler thermostat may not be correct having regard to the temperature in the space to be heated and so the necessary comfort conditions cannot be obtained. Since in such a central heating system the boiler thermostat is not directly influenced by heat gains or losses within the space to be heated and consequently will take a relatively long time to respond to such gains and losses, there will be periods when the space to be heated is either overheated or underheated and, as a result, there may well be a waste of fuel.

According to the present invention there is provided a control apparatus for a fuel fired central heating boiler providing circulating heating water for space heating comprising a first temperature control circuit for controlling the firing of the boiler and the temperature of the circulating heating water including a first temperature sensitive element for sensing an external ambient temperature and a second temperature sensitive element for sensing the temperature of the circulating heating water, the first and second temperature sensitive elements being connected in series and having different resistance/temperature characteristics from one another such that a change in the external ambient temperature corresponds to a greater change in the temperature of the circulating heating water and determines a maximum slope of temperature change within the circulating heating water for a given external ambient temperature; a second temperature control circuit including a third temperature sensitive element for sensing the temperature in a space to be heated and in response thereto for controlling the firing of the boiler and the circulation of the circulating heating water and arranged to determine automatically the slope of the temperature change within said circulating water below the maximum slope; and an output circuit for controlling the firing of the boiler coupled to both the first and second temperature control circuits and adapted to be responsive to the first temperature control circuit and/or the second temperature control circuit.

The control apparatus may include a flip-flop circuit connected to be controlled by the first and second temperature control circuit. In the preferred embodiment the flip-flop circuit is a transistor amplifier, a coil of a relay of the output circuit means being connected in the collector-emitter path of one transistor of the amplifier, so that the relay is in a first condition when the transistor is conductive and the relay is in a second condition when the transistor is non-conductive.

Preferably the control apparatus includes a DC power source arranged to produce a DC output to power the flip-flop circuit.

Preferably the control apparatus includes a third temperature control circuit for controlling the maximum temperature of the circulating water.

According to a further aspect of the present invention there is provided a fuel fired central heating boiler having a control apparatus as recited above.

Figure 2:
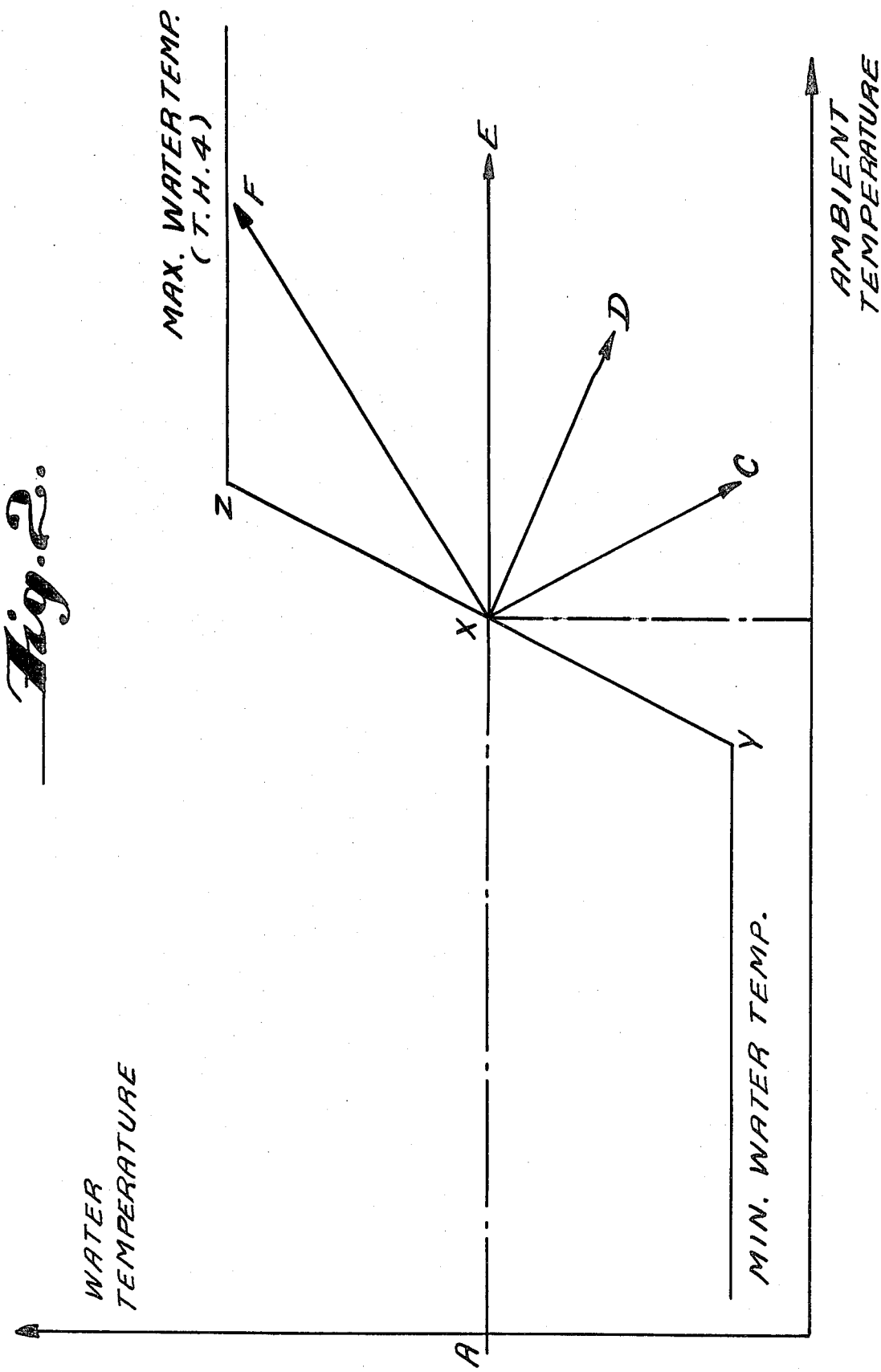

The invention is illustrated, merely by way of example, in the accompanying drawings wherein FIG. 1 is a circuit diagram of a control apparatus according to the present invention for a fuel fired central heating boiler and FIG. 2 is a graphical representation of the maximum temperature change slope and its variation.

Referring now to FIG. 1, the control apparatus has an AC input connected to a terminal L itself connected to a live line 10 and a terminal N connected to a neutral line 11. A DC power source 12, consisting of a capacitor C3, diodes D7, D8, capacitors C1, C2, a resistor R11 and zener diodes Z1, Z2 is connected across the lines 11, 12 and produces a DC voltage output at points P, Q to which rails 13, 14 are connected. The DC power source 12 is arranged so that the rail 13 is at a positive potential and the rail 14 is at a negative potential.

An amplifier 15 is connected across points, P, Q and comprises transistors T4, T5, resistors R6, R7, R8, R9, R10 and a coil RL1C of a relay RL1. The output from the amplifier 15 is derived from transistors T4, T5 which form a flip-flop circuit. The emitter of the transistor T4 is coupled to the positive rail 13 via the coil RL1C of the relay RL1. The collector of the transistor T4 is coupled to the negative rail 14 via the resistor R6. The emitter of the transistor T5 is coupled to the positive rail 13 via the resistor R7 and its collector is coupled to the negative rail 14 via the resistor R8. The base of the transistor T4 is coupled to the collector of the transistor T5 via the resistor R9. Thus when the transistor T5 is conductive, the transistor T4 is non-conductive and when transistor T5 is non-conductive the transistor T4 is conductive energising the coil RL1C of the relay RL1. The transistors T4, T5 are PNP transistors and afford DC voltage amplification advantages when coupled as illustrated.

A first temperature control circuit 16 includes an NPN transistor T1 whose emitter is connected via a diode D4 to the negative rail 14 whilst its collector is coupled via a coil RS1C of a reed switch RS1 to the positive rail 13. A second temperature control circuit 17 includes an NPN transistor T2 whose emitter is coupled to a negative rail 14 via a diode D5 whilst its collector is coupled to the positive rail 13 via a resistor R4. A third temperature control circuit 18 includes an NPN transistor T3 whose emitter is coupled to the negative rail 14 via a diode D6 and whose collector is coupled to the positive rail 15 via a resistor R5.

The base of the transistor T1 has its voltage derived from a potential divider consisting of a variable resistor VR1, a potentiometer P1, a fixed value resistor R1 and a thermistor TH1. The variable resistor VR1 is provided for trimming purposes and has one side connected to the negative rail 14 and the other side to one side of the potentiometer P1. The other side of the potentiometer P1 is connected to the base of the transistor T1. The thermistor TH1 and the resistor R1 are connected in parallel between the positive rail 13 and the base of the transistor T1.

The base of the transistor T3 has its voltage derived, in like manner to the transistor T1, from a potential divider consisting of a variable transistor VR3, a fixed value resistor R3 and a thermistor TH4. One side of the variable resistor VR3 is connected to the negative rail 14 and the other side is connected to the base of the transistor T3. The resistor R3 and the thermistor TH4 are connected in parallel between the base of the transistor T3 and the positive rail 13.

The base of the transistor T2 is coupled to the negative rail 14 via a potentiometer and a variable resistor VR2 in a like manner to the transistor T1. The base of the transistor T2 is coupled to the positive rail 14 by a resistor R2. Two thermistors TH2, TH3 are connected in series with one another and this series arrangement is connected in parallel with the resistor R2.

The reed switch RS1 is connected in series with a coil RL2C of a relay RL2, this series arrangement being in parallel with the capacitors C2 of the DC power source 12. The AC voltage on line 11 is fed to a common contact a of the relay RL2 and to a normally open contact b of the relay RL1. A common contact c of the relay RL1 is connected to a terminal B to supply a burner control circuit (not shown) of a fuel fired central heating boiler, a normally closed contact d of the relay RL1 being fed to a terminal C which is connected to a normally closed contact of a water temperature thermostat (not shown) which may, for example, be located in or adjacent to a hot water storage cylinder. A normally open contact e of the relay RL2 is fed to a terminal F which is connected to a common terminal of the water temperature thermostat, whilst a normally closed contact f of the relay RL2 is connected via a terminal D to a circulating pump (not shown) and a terminal E connected to a normally open contact of the water temperature thermostat. Common neutral connections are, of course, provided for the circulating pump and the burner control circuit.

The collectors of the transistors T1, T2, T3 are coupled by respective diodes D1, D2, D3 to one side of the resistor R10 whose other side is connected to the base of the transistor T5.

The operation of the control apparatus will now be described in connection with the control of a fuel fired central heating boiler.

The thermistors TH3, TH4 are located in a phial (not shown) which is inserted in a hot water output flow line of the boiler, the thermistor TH2 is located outside the building to be heated and the thermistor TH1 is located within the space to be heated.

The characteristics displayed by the thermistors TH2, TH3 which have negative temperature co-efficients, is selected so that when coupled with the potentiometer P2 and the variable resistor VR2, the arrangement is such that with decrease in external ambient temperature there will be a rise in the resistance of the series arrangement of the thermistors TH2 and TH3 when the variable resistor VR2 and the potentiometer P2 are kept constant and thus the transistor T2 will not be rendered conductive until the thermistor TH3 senses a higher temperature in the hot water output flow line of the boiler.

If the space to be heated is designed to be maintained at the temperture of 21° C. with an external ambient temperature of −1° C., the boiler must be capable of maintaining an inside temperature of 21° C. with a temperature difference of 22° C. at maximum design load. When the external ambient temperature is 15.5° C. and the inside temperature is 21° C., there will be a 5.5° C. temperature difference and the boiler will be operating at 25% of the maximum design load. If the water circulation temperature, unheated, is 21° C., and the design condition of the water circulation temperature is 76.5° C., then the boiler must be capable of producing a 55.5° C. temperature rise in the circulating water. If the external ambient temperature, however, is 15.5° C., the boiler will again be operating at 25% of the maximum design load and consequently the water circulation temperature will only rise to 35° C. In this example, the characteristics, therefore, of the thermistor TH2 should be such that for a 22° C. change in external ambient temperature more than twice the temperature rise sensed by the thermistor TH3 will be required to equalise this change. Thus the thermistors TH2, TH3 have different resistance/temperature characteristics.

If the boiler is designed so that at maximum design load it can maintain an inside temperature of 21° C. with an external ambient temperature of −1° C., in more severe conditions, for example −4° C., the water circulation temperature, if solely controlled by the thermistors TH2, TH3 would be in excess of boiling point. To avoid this, the temperature control circuit 18 is provided. Thus the transistor T3 can be designed to operate at a given temperature, sensed by the thermistor TH4, below the boiling point of water by suitable adjustment of the variable resistor VR3. For example, the variable resistor VR3 may be arranged so that the maximum water circulation temperature from the boiler is 82° C. which temperature could occur, for example, in severe weather or in the event of faults occuring in the thermistors TH1, TH2, TH3.

The variable resistor VR1 is set to provide a maximum temperature within the space to be heated, the variable resistor VR2 is set to provide a maximum water circulation temperature, and the potentiometer P2 is adjusted in accordance with the expected range of external ambient temperature. The control apparatus so set operates in the following manner. The AC supply is connected to terminals L, N, and the circulating pump is connected between the terminal D and neutral, and the burner control circuit is connected between the terminal B and and neutral. With stable external ambient temperature, sensed by the thermistor TH2, the circulating pump will circulate water and combustion will be created in the boiler so that the temperature of the circulating water will rise. This is achieved because the transistors T1, T2, T3, T5 are non-conductive while the transistor T4 is conductive and a base-emitter current flows through the coil RL1C so that the common contact of the relay RL1 is in electrical connection with the normally open contact b thereof so that the burner control circuit is energised. The circulating pump is energised via the normally closed contact f of the relay RL2.

When the preset water circulation temperature is reached, the thermistor TH3 renders the transistor T2 conductive and current flows through the resistor R7, the base-emitter path of the transistor T5, the resistor R10, the diode D2, the collector-emitter path of the transistor T2 and the diode D5. The collector current flowing through the transistor T2 is limited by the diodes D3, D1 avoiding a rise in the emitter voltage of the transistor T2 which would otherwise cause it to become non-conductive. Thus when the transistor T2 is conductive, the transistor T5 becomes conductive and the resultant voltage rise across the resistor R8 causes the transistor T4 to become non-conductive. When the transistor T4 becomes non-conductive the relay RL1 is de-energised and the burner control circuit is thus also de-energised so that combustion in the boiler is terminated. The circulating pump remains energised, however, through the normally closed contact f of the relay RL2 to remove the stored heat in the boiler. When the water circulation temperature falls sufficiently to allow the resistance change in the thermistor TH3 to rise and render the transistor T2 non-conductive, the transistor T5 will become non-conductive and the transistor T4 will become conductive energising the relay RL1 and thus establishing once again combustion in the boiler. The change in water temperature required to change the transistor T2 from being conductive to being non-conductive and vice-versa can be made very small, for example, of the order of 2° C. or 3° C. This will, however, not result in the boiler responding rapidly to small fluctuations of temperature sensed by the thermistor TH2 because of its thermal inertia thus avoiding the risk of the boiler and the burner control circuit being damaged. The fact that the transistor T2 responds to relatively small temperature changes sensed by the thermistor TH2 will greatly reduce the heat emission from the boiler compared to the case where the transistor T2 will only respond to relatively large temperature ranges.

The circulating pump extracts residual heat from the boiler so that water will continue to circulate at a fixed flow rate at a temperature which is correct relative to the external ambient temperature and the temperature in the space to be heated will rise to the required temperature under the control of the transistor T2 which is, itself, controlled by the thermistors TH3 and TH2.

Ignoring for the moment any changes in the external ambient temperature affecting the thermistor TH2, the transistor T2 will be controlled in depencence upon both external ambient temperature and water circulation temperature and the temperature in the space to be heated will fluctuate with the rise and fall of the temperature of the circulating water. If there are heat gains within the space to be heated due, for example, to occupancy, lighting or operating equipment which adds heat to the space, when the transistor T2 is not conductive, and therefore combustion established in the boiler, the temperature in the space to be heated will rise until the thermistor TH1 causes the transistor T1 to become conductive. Current will then flow via the resistor R7, the base emitter path of the transistor T5, the resistor R10, the diode D1, the collector-emitter path of the transistor T1 and the diode D4. The diodes D2, D3 will prevent excess collector current flowing in the transistor T1, to avoid a rise in the emitter voltage of the transistor T1 which would otherwise cause it to become non-conductive. When the transistor T1 becomes conductive, the transistor T5 becomes conductive and the transistor T4 is rendered non-conductive so de-energising the relay RL1 so that combustion in the boiler is terminated. Once again water circulation is maintained by the circulating pump and the temperature in the space to be heated will fall as the temperature of the circulating water falls until the resistance of the thermistor TH1 changes sufficiently to render the transistor T1 non-conductive so that the relay RL1 is re-energised. This situation will continue until there is a greater demand for heat in the space to be heated or there is a change in external ambient temperature. Thus the desired temperature in the space to be heated will be maintained whilst reducing unnecessary wastage of fuel.

If a change in the external ambient temperature occurs such as the weather becomes colder, the resistance of the thermistor TH2 will rise demanding a higher temperature of the circulating water, the transistor T2 will be rendered conductive and the temperature of the circulating water will rise to a new temperature level determined by the transistor T2. When this new temperature level is reached the transistor T2 is rendered non-conductive and the temperature in the space to be heated is controlled by the thermistor TH1 and the transistor T1.

If the ambient temperature increases, the resistance of the thermistor TH2 will fall calling for a lower temperature of the circulating water and the transistor T2 will not be rendered conductive until the temperature of the circulating water has fallen to a new temperature level. The temperature in the space to be heated will thus be controlled at this new temperature level by the thermistor TH1 and the transistor T1.

It will be appreciated, therefore, that the thermistor TH1 "sees" change in external ambient temperature before it can be sensed in the space to be heated so reducing wide temperature fluctuations in the space to be heated and wastage of fuel. The thermistors TH3, TH2 are continuously adjusting with change in external ambient temperature and temperature in the space to be heated whether or not the transistors T1, T2 are conductive or non-conductive. This is advantageous in that when a space is to be heated from cold in the early morning, before the space to be heated has risen to its desired temperature well over an hour may have elapsed, and if during this initial period the external ambient temperature has risen and no correction has taken place, then the space to be heated will be overheated even after the transistor T1 has been rendered non-conductive. This is prevented in that the temperature of the circulating water is adjusted with rise in external ambient temperature. Likewise, should the external ambient temperature continue to fall during the initial period, the temperature of the circulating water is increased to smooth stable control of the boiler and rise in temperature in the space to be heated.

Should the external ambient temperature fall rapidly, the temperature in the space to be heated may not rise to the required level even though the temperature of the circulating water continues to rise. If the external ambient temperature falls below a set level determined by the potentiometer P2 the temperature of the circulating water will rise to the maximum temperature determined by the transistor T3 and the thermistor TH4. This maximum temperature is set by the variable resistor VR3 which is either preset or adjustable to suit the boiler and the control apparatus. Likewise the variable resistor VR2 can be preset or adjusted to suit the boiler and the control apparatus. The adjustment of the variable resistors VR2, VR3 is designed to accommodate for oversize or undersize of a boiler and its associated circulating pump for the space to be heated.

Considering now a hot water supply produced by the boiler, when hot water is available from the hot water cylinder at a temperature of about 71° C., a consumer will more often than not add cold water to reduce its temperature to a satisfactory level for purposes such as bathing and dishwashing. The boiler delivers, in a primary circulating system, hot water at a temperature above 52° C. to the hot water cylinder. In mild weather, where only a short heating period in the morning is required and the external ambient temperature rises, it may not be necessary for the boiler to produce hot water again until the evening. As a result, if a relatively large quantity of hot water is used, the temperature of the water stored in the hot water cylinder may be inadequate because combustion has not been established in the boiler because the temperature in the space to be heated is satisfied and the temperature in the space to be heated has continued to rise after combustion in the boiler was terminated. This characteristic can be utilised in the control apparatus illustrated because it represents a condition when thermistor TH1 on the base of transistor T1 has a continuous impedance change with temperature which ensures that the transistor T1 will be well into its conductive state. Since the coil RSC1 of the reed switch RS1 is placed in the collector circuit of the transistor T1, then the latter will be rendered conductive and the relay RL1 will be de-energised before it can reach the pull-in level of the reed switch RS1. If, therefore, the temperature continues to rise in the space to be heated after combustion in the boiler has been terminated, the reed switch RS1 will monitor hot water requirements so that a minimum supply of hot water will be available. As can be seen from the drawing, the reed switch RS1 is in series with the coil RL2C of the relay RL2. Thus when the temperature in the space to be heated continues to rise above a predetermined level, then the reed switch RS1 closes energising the relay RL2 so de-energising the circulating pump. The water temperature thermostat provided on the hot water cylinder is preferably such that it has a large temperature differential and so that it closes at a minimum hot water temperature.

As stated previously, the common connection of the water temperature thermostat is connected to the terminal F and the normally closed contacts of the water temperature thermostat are connected to the terminal C. If, therefore, the hot water temperature is below its minimum hot water temperature when the reed switch RS1 is energised then combustion is established in the boiler via the relay RL2, the hot water thermostat and the relay RL1, though the circulating pump is not energised. The hot water is circulated by gravity feed to the hot water cylinder and the water temperature thermostat will terminate combustion in the boiler when the hot water temperature is clearly above the minimum hot water temperature. When the water temperature thermostat terminates combustion in the boiler, it disengages its normally closed contact and engages its normally open contact thus energising the circulating pump so that any excess heat unused in the boiler can be dissipated within the space to be heated. When the circulating pump is de-energised, it provides a high impedance circulating path to the hot water and allows a higher efficiency rate of the gravity feed to the hot water cylinder. Thus the hot water is maintained in a satisfied condition during relatively mild weather guaranteeing a minimum temperature of hot water available, the circulating pump being rendered de-energised only when the temperature in the space to be heated is at the desired temperature.

The disengagement of the circulating pump is achieved through energization of relaty RL2 coil, the operation of RL2 coil is dependent on the reed switch RS1, whose energization coil is located in the collector of transistor T1 which is in circuit block 16. The energization and de-energization of transistor T1 occurs when thermistor TH1 is of such impedance to all base off emitter current of transistor T1 to switch on or off. Thus the circulating pump will switch off when the space temperature is satisfied, and remain off until the hot water for other purposes is well above the minimum temperature, and should this occur before the transistor T1 allows relay RL2 to de-energize, the water pump is energized by the satisfied condition of transistor T1 having engaged RL2 and the electrical connection between the common of the water thermostat and is normally open contact. This allows the water to continue to circulate in the system when the influence of thermistor TH1 is interacting with thermistors TH2 and TH3 to adjust the water temperature below that of the maximum allowable temperature at any time of operation.

The control apparatus described above has many advantages the main one of which is to maintain a predetermined temperature in the space to be heated as a function of external ambient temperature. It will be appreciated that should the predetermined temperature in the space to be heated be varied from its design condition by adjustment of the potentiometer P1, then the boiler may be over or undersized. To counteract this the potentiometer P2 is coupled to the same spindle as the potentiometer P1. Thus an increase in the predetermined temperature within the space to be heated requires a similar increase in the temperature in the circulating water and both these functions require reductions in the resistance of the potentiometers P1, P2. Likewise, a lowering of the predetermined temperature within the space to be heated requires a lowering of the temperature of the circulating water and, therefore, an increase in the resistance of potentiometers P1, P2. Thus the control characteristics of the potentiometers P1, P2 are such that the boiler maintains its optimum operating conditions with no effect upon maximum temperature of the circulating water or minimum temperature of hot water.

Referring now to FIG. 2 there is shown a graphical representation of the maximum temperature change slope and its variation. In a heating system deployed for space heating purposes the environment being heated and controlled, may not necessarily having the heating system as the only energy input. Influences of other appliances such as focal point fires, occupancy, body heat, lighting and cooking appliances can input to the space considerable energy inputs, and this can be further augmented by heat loss from a hot water storage tank. The deployment of thermistors TH2 and TH3 take no account of these energy inputs and considerable overheat will occur unless the detection of these influences can be inputed to the system. From FIG. 2, it cn be seen that the set water temperature, along the slope Y.Z is achieved due to the nature of TH2 and TH3 alone, which is inherent in their construction within circuit block 17. The temperature control point X will occur when the ambient temperature B exists, any energy input to the building or space from its environmental gains will reduce the water temperature down the line of XB when no external ambient change occurs. The rotation around X occurs when environmental gains from cooking and lighting are present when the outside temperature detector TH2 becomes aware of external ambient changes, the line XC occurs with small ambient change whilst XC occurs when the ambient change is slightly larger than that occurring in the change showing on the line XC. The line XE occurs when internal gains are equal to the changing ambient conditions. The line XE occurs when internal gains are equal to the changing ambient conditions. The line XF occurs when the ambient change effects are greater than the environmental gains. The line XZ occurs when there are no environmental gains within the system or space.

I claim:

1. A control apparatus for a fuel fired central heating boiler providing circulating heating water for space heating comprising:

a first temperature control circuit for controlling the firing of said boiler and the temperature of said circulating heating water including a first temperature sensitive element for sensing an external ambient temperature and a second temperature sensitive element for sensing the temperature of said circulating heating water, said first and second temperature sensitive elements being connected in series and having different resistance/temperature characteristics from one another such that a change in said external ambient temperature corresponds to a greater change in the temperature of said circulating heating water and determines a maximum slope of temperature change within said circulating heating water for a given external ambient temperature;

a second temperature control circuit including a third temperature sensitive element for sensing the temperature in a space to be heated and in response thereto for controlling the firing of said boiler and the circulation of said circulating heating water and arranged to determine automatically the slope of the temperature change within said circulating heating water below said maximum slope; and an output circuit for controlling the firing of said boiler coupled to both said first and second temperature control circuits and adapted to be responsive to said first temperature control circuit and/or said second temperature control circuit.

2. Control apparatus as claimed in claim 1 wherein said output circuit includes a flip-flop circuit connected to be controlled by the first and second temperature control circuits.

3. Control apparatus as claimed in claim 2 further including a DC power source arranged to produce a DC output to power the flip-flop circuit.

4. Control apparatus as claimed in claim 2 in which the flip-flop circuit is a transistor amplifier, and wherein said output circuit further includes a coil of a relay connected in the collector-emitter path of a transistor of the amplifier, so that the relay is in a first condition when the transistor is conductive and the relay is in a second condition when the transistor is non-conductive.

5. A control apparatus as claimed in claim 1 further including a third temperature control circuit for controlling the maximum temperature of the circulating water.

6. A control apparatus as claimed in claim 1 in which the first and second temperature sensors are thermistors.

7. A fuel fired central heating boiler having a circulating heating water for space heating and a control apparatus comprising:

a first temperature control circuit for controlling the firing of said boiler and the temperature of said circulating heating water including a first temperature sensitive element for sensing an external ambient temperature and a second temperature sensitive element for sensing the temperature of said circulating heating water, said first and second temperature sensitive elements being connected in series and having different resistance/temperature characteristics from one another such that a change in said external ambient temperature corresponds to a greater change in the temperature of said circulating heating water and determines a maximum slope of temperature change within said circulating heating water for a given external ambient temperature;

a second temperature control circuit including a third temperature sensitive element for sensing the temperature in a space to be heated and in response thereto for controlling the firing of said boiler and the circulation of said circulating heating water and arranged to determined automatically the slope of the temperature change within said circulating heating water below said maximum slope; and an output circuit for controlling the firing of said boiler coupled to both said first and second temperature control circuits and adapted to be responsive to said first temperature control circuit and/or said second temperature control circuit.

8. A control apparatus for a fuel fired central heating boiler providing a circulating heating medium for space heating comprising:

a first temperature control circuit for controlling the firing of said boiler and the temperature of said circulating heating medium including a first temperature sensitive element for sensing an external ambient temperature and a second temperature sensitive element for sensing the temperature of said circulating heating medium, said first and second temperature sensitive elements being connected in series and having different resistance/temperature characteristics from one another such that a change in said external ambient temperature corresponds to a greater change in the temperature of said circulating heating medium and determines a maximum slope of temperature change within said circulating heating medium for a given external ambient temperature;

a second temperature control circuit including a third temperature sensitive element for sensing the temperature in a space to be heated and in response thereto for controlling the firing of said boiler and the circulation of said circulating heating medium and arranged to determine automatically the slope of the temperature change within said circulating heating medium below said maximum slope; and an output circuit for controlling the firing of said boiler coupled to both said first and second temperature control circuits and adapted to be responsive to said first temperature control circuit and/or said second temperature control circuit.

9. Control apparatus as claimed in claim 8 wherein said output circuit includes a flip-flop circuit connected to be controlled by the first and second temperature control circuits.

10. Control apparatus as claimed in claim 9 in which the flip-flop circuit is a transistor amplifier, and wherein said output circuit further includes a coil of a relay connected in the collector-emitter path of a transistor of the amplifier, so that the relay is in a first condition when the transistor is conductive and the relay is in a second condition when the transistor is non-conductive.

11. Control apparatus as claimed in claim 9 further including a DC power source arranged to produce a DC output to power the flip-flop circuit.

12. A control apparatus as claimed in claim 8 further including a third temperature control circuit for controlling the maximum temperature of the circulating medium.

13. A control apparatus as claimed in claim 8 in which the first and second temperature sensors are thermistors.

14. An apparatus according to claim 8, 9, 10, 11, 12, 13, or 15 wherein said circulating heating medium is water.

15. A fuel fired central heating boiler having a circulating heating medium and a control apparatus comprising:

a first temperature control circuit for controlling the firing of said boiler and the temperature of said circulating heating medium including a first temperature sensitive element for sensing an external ambient temperature and a second temperature sensitive element for sensing the temperature of said circulating heating medium, said first and second temperature sensitive elements being connected in series and having different resistance/temperature characteristics from one another such that a change in said external ambient temperature corresponds to a greater change in the temperature of said circulating heating medium and determines a maximum slope of temperature change within said circulating heating medium for a given external ambient temperature;

a second temperature control circuit including a third temperature sensitive element for sensing the temperature in a space to be heated and in response thereto for controlling the firing of said boiler and the circulation of said circulating heating medium and arranged to determine automatically the slope of the temperature change within said circulating heating medium below said maximum slope; and an output circuit for controlling the firing of said boiler coupled to both said first and second temperature control circuits and adapted to be responsive to said first temperature control circuit and/or said second temperature control circuit.

* * * * *